(12) United States Patent
Jiao

(10) Patent No.: US 9,800,507 B2
(45) Date of Patent: Oct. 24, 2017

(54) APPLICATION-BASED PATH COMPUTATION

(71) Applicant: Verizon Patent and Licensing Inc., Arlington, VA (US)

(72) Inventor: Fan Jiao, Cupertino, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 75 days.

(21) Appl. No.: 14/618,733

(22) Filed: Feb. 10, 2015

(65) Prior Publication Data
US 2016/0234099 A1 Aug. 11, 2016

(51) Int. Cl.
| H04L 12/751 | (2013.01) |
| H04L 12/813 | (2013.01) |
| H04L 12/851 | (2013.01) |
| H04L 12/707 | (2013.01) |
| H04L 29/06 | (2006.01) |
| H04L 12/715 | (2013.01) |

(52) U.S. Cl.
CPC ............. *H04L 47/20* (2013.01); *H04L 45/02* (2013.01); *H04L 47/2441* (2013.01); *H04L 45/64* (2013.01); *H04L 69/22* (2013.01)

(58) Field of Classification Search
CPC ..... H04L 47/20; H04L 47/2441; H04L 45/02; H04L 45/64; H04L 69/22
See application file for complete search history.

(56) References Cited

U.S. PATENT DOCUMENTS

| 6,690,678 | B1 * | 2/2004 | Basso | H04L 12/5602 370/395.1 |
| 2003/0005144 | A1 * | 1/2003 | Engel | H04L 47/10 709/235 |
| 2004/0148391 | A1 * | 7/2004 | Lake, Sr. | H04L 12/5695 709/224 |
| 2007/0248009 | A1 * | 10/2007 | Petersen | H04L 12/4633 370/230 |
| 2008/0114892 | A1 * | 5/2008 | Bruno | H04L 45/125 709/234 |
| 2010/0188976 | A1 * | 7/2010 | Rahman | H04L 47/10 370/235 |
| 2010/0290393 | A1 * | 11/2010 | Matsushita | H04L 45/00 370/328 |
| 2014/0241164 | A1 * | 8/2014 | Cociglio | H04L 47/2475 370/235 |

* cited by examiner

*Primary Examiner* — Omar Ghowrwal

(57) ABSTRACT

A software-defined network (SDN) may include a controller that causes data an flow to be routed at least partially based on an application associated with the flow. The controller may identify an application associated with a flow and may determine desired transmission characteristics associated with the application. The controller may then dynamically identify an appropriate path for the flow data based on the desired transmission characteristics. The controller may further identify a quality of service value associated with a source or destination device associated with the flow data and may adjust the quality of service value based on the desired transmission characteristics associated with the application.

20 Claims, 9 Drawing Sheets

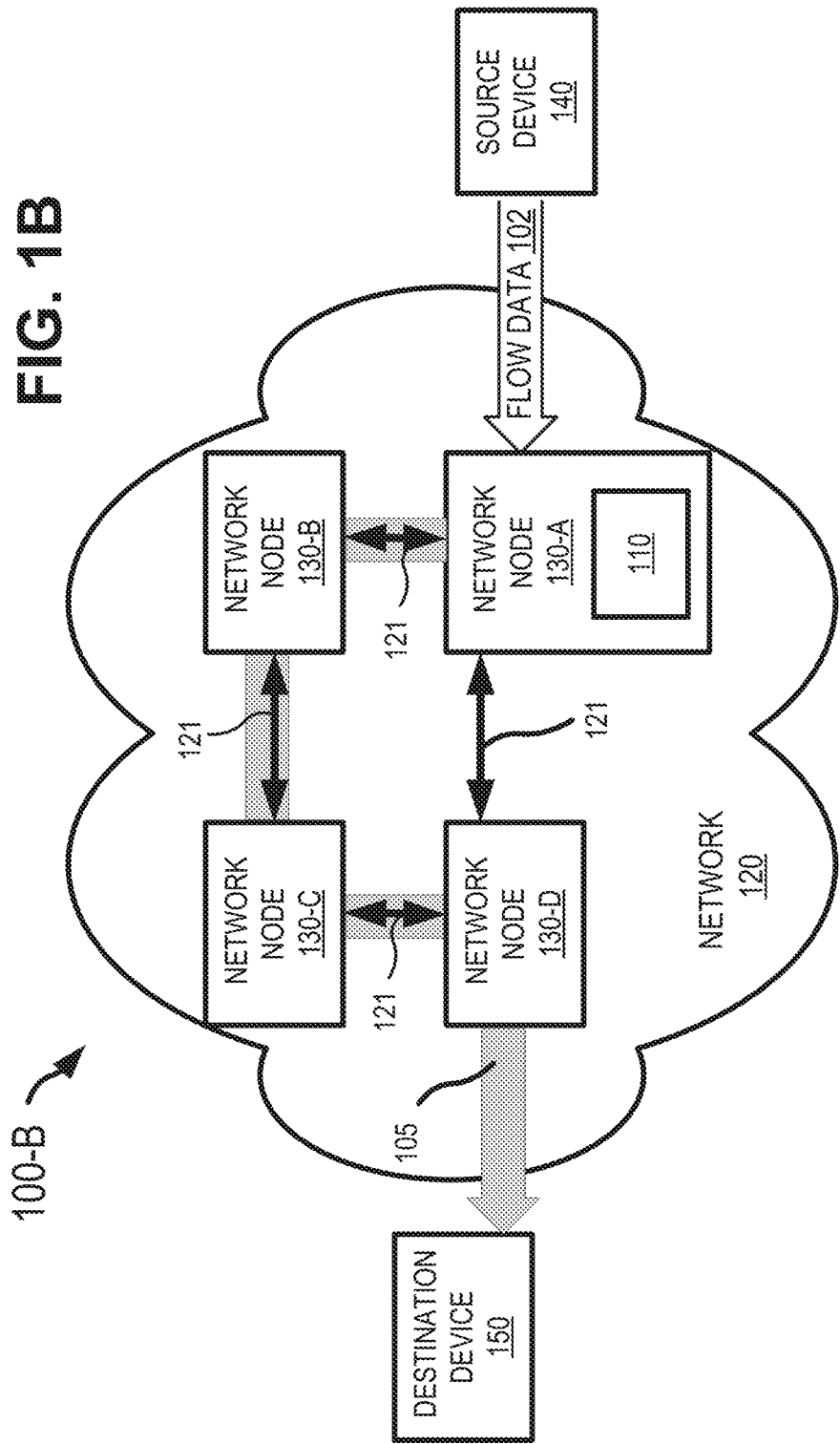

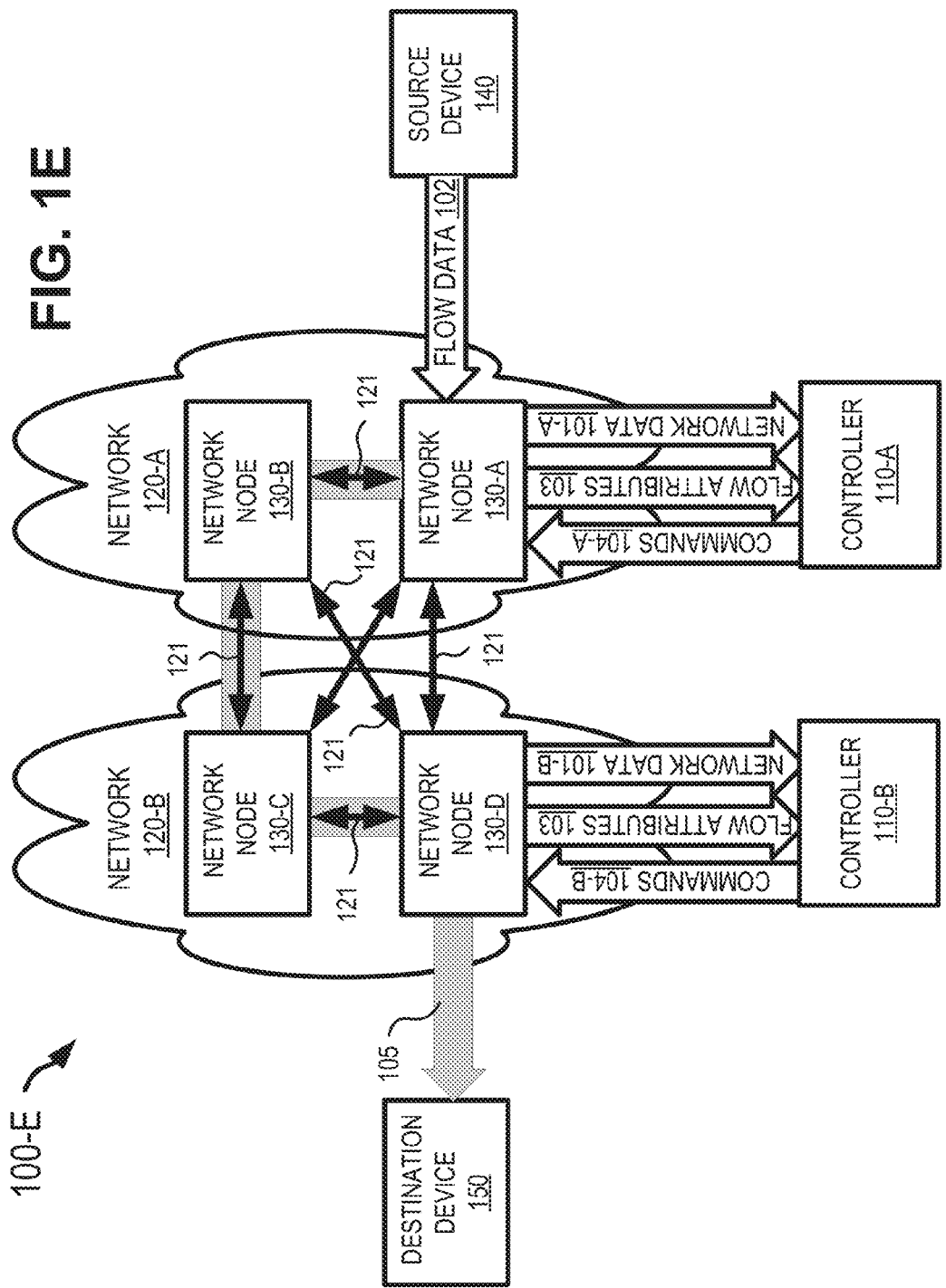

US 9,800,507 B2

APPLICATION-BASED PATH COMPUTATION

BACKGROUND INFORMATION

A network device, such as a router or a switch, may use a control plane and a forwarding plane to exchange data within a network or between different networks. The control plane may generate and maintain a routing table that lists routes and physical interface connections that may be used to forward data. For example, the routing table may include information identifying static routes or by routes identified through a dynamic routing protocol. When data from a new flow is received by the network device, the forwarding plane may use the routing table to identify an available path and may forward the data via the identified path. The forwarding plane may store, in a forwarding table, information associating the flow with the path so that additional data from the flow may also be routed via the same path.

To improve network performance, a software-defined network (SDN) may separate the control plane from the physical network. In an SDN, instructions for handing network traffic may be dynamically generated, and the instructions may control the manner in which the network device processes network traffic. For example, the instructions may control how network devices route traffic, prioritize different traffic, translate traffic between network protocols, etc.

For example, as described in Request for Comments (RFC) 4655 by the Internet Engineering Task Force (IETF), a computer, an application, a network node, etc. may function as a path computation element (PCE) for performing constraint-based path computations to determine suitable route through a network for conveying data between a source and a destination. For example, the PCE may receive a connection request from a path computation client (PCC), and based on a specified destination and other constraints associated with the request (e.g., a desired connection type or a desired bandwidth), the PCE may dynamically identify, to the PCC, nodes and links (or paths) to be used for the connection. The PCC may then exchange signals with other network elements to establish the connection via the identified nodes and/or links.

In another example, an SDN may be implemented using OPENFLOW. In OPENFLOW, a controller may collect data on the status of network devices, such as identifying available bandwidth, open ports, storage queue length, etc. at the network devices. The controller may apply various routing and/or logic rules to update the routing and/or the forwarding tables.

BRIEF DESCRIPTION OF THE DRAWINGS

FIGS. 1A-1E illustrate exemplary environments in which systems and methods described herein may be implemented;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a software-defined network (SDN) in which a controller may cause data an flow to be routed at least partially based on an application associated with the flow. For example, the controller may identify an application associated with a flow and may determine desired transmission characteristics associated with the application. As used herein, the application associated with a flow may correspond to an application generating, transmitting, modifying, using, and/or requesting the flow data. The controller may then dynamically identify an appropriate path for the flow data based on the desired transmission characteristics. In another example, the controller may identify a quality of service value associated with a source or destination device associated with the flow data, and the controller may adjust the quality of service value associated with flow data based on the desired transmission characteristics associated with the application.

Figure 1A:
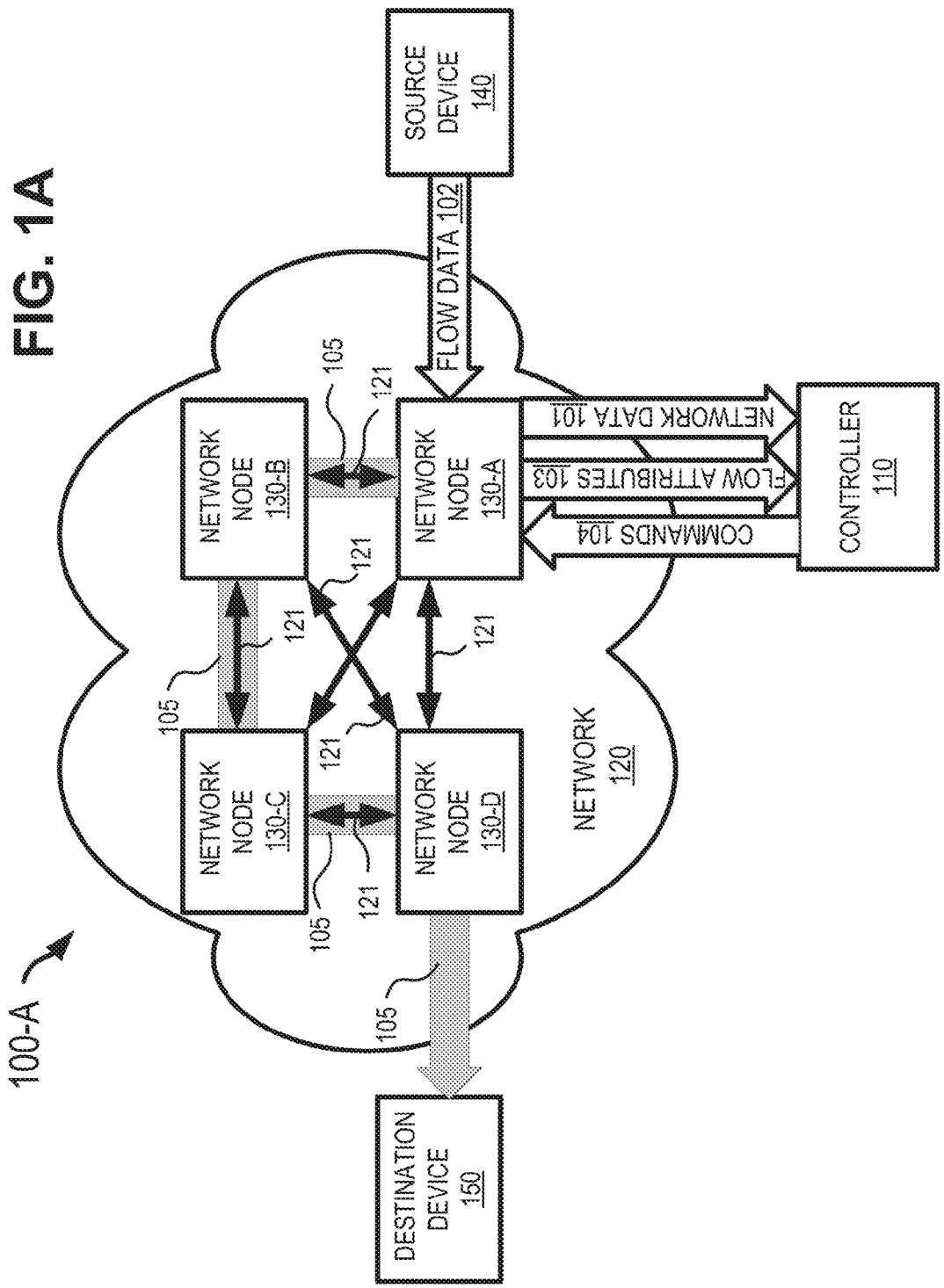
Figure 1C:
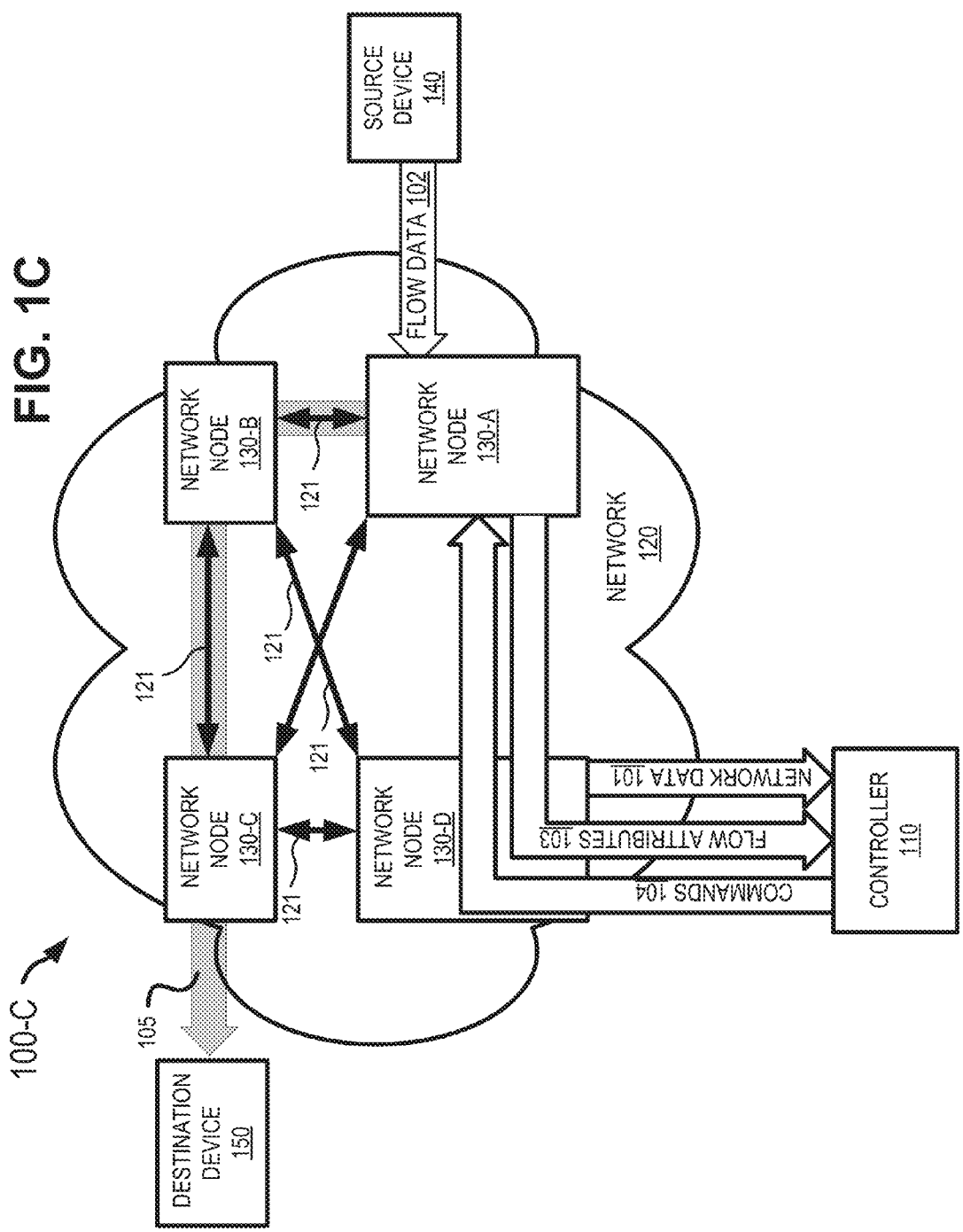
Figure 1D:
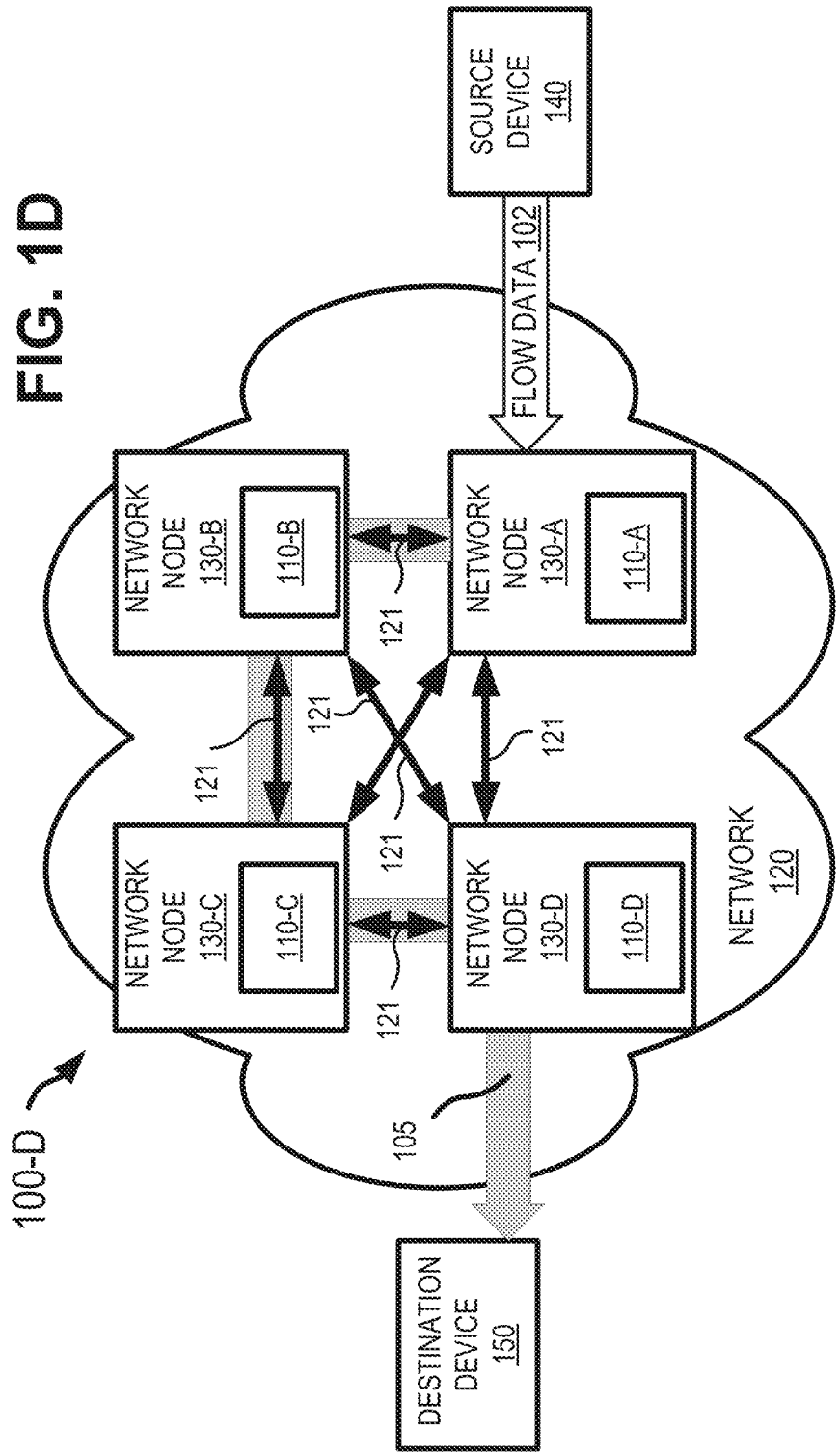

FIGS. 1A-1E show an environment 100 (shown in FIG. 1A as environment 100-A, in FIG. 1B as environment 100-B, in FIG. 1C as environment 100-C, in FIG. 1D as environment 100-D, and in FIG. 1E as environment 100-E). As illustrated in FIGS. 1A-1D, environment 100 may include a controller 110, a network 120 that includes connections 121 between network nodes 130-A through 130-D (referred to collectively as network nodes 130 and individually as network node 130), a source device 140, and a destination device 150.

In the following examples, source device 140 may forward flow data 102, such as a flow of packets, to network node 130-A, and controller 110 may provide commands 104 that cause flow data 102 to be forwarded through network 120 to destination device 150 using a selected path 105 that includes a certain connections 121 and network nodes 130. As used herein, a traffic flow may refer to communication of information (e.g., via a packet) received by or transmitted from network node 130-A.

To determine commands 104, controller 110 may identify an application associated with flow data 102 and may determine one or more desired characteristics associated with transmission of flow data 102. For example, if flow data 102 is associated with an application to stream multimedia content, controller 110 may identify path 105 that includes a group of connections 121 and network nodes 130 that combine to forward flow data 102 with transmission delay, packet drop, bandwidth levels, etc. within desired ranges. In another example, if flow data 102 is associated with a communications application, such as an application for voice-over internet protocol (VoIP) transmissions, controller 110 may identify path 105 that minimizes jitter of flow data 102 (e.g., a variation in time of when data units within flow data 102 are received at destination device 150), or other transmission characteristic. Controller 110 may further modify attributes associated with flow data 102, such as to modify a quality of service (QoS) values associated with flow data 102 so that flow data 102 is transmitted according to desired parameters via path 105.

Controller 110 may include a computing device capable of receiving input and/or communicating with a network node 130 (e.g., network node 130-A in FIG. 1A). For example, controller 110 and network node 130-A may communicate via one or more network nodes 130 and/or connections 121 of network 120. Controller 110 may include a server, a desktop computer, a laptop computer, a tablet computer, a handheld computer, a smart phone, or a similar device. The controller 110 may include, for example, a network management system (NMS), an element management system (EMS), an operations support system (OSS), a craft interface (CI), a command line interface (CLI), etc. The controller 110 may communicate with network node 130-A to establish path 105 using network various management interfaces and protocols. For example, as shown in FIG. 1A, controller 110 may communicate with network node 130-A to receive network data 101 associated with network 120 (e.g., a condition of network 120, a capability of network 120, a status of network nodes 130 or connections 121, etc.).

Network data 101 may identify, for example, a condition of network 120, a capability of network 120, a structure of network 120, or other information associated with network 120. For example, network data 101 may identify an amount of traffic and/or a bandwidth being utilized by network nodes 130, a traffic and/or bandwidth utilization rate of network nodes 130, an amount of traffic and/or a bandwidth supported by network nodes 130, a protocol supported by network nodes 130, a quantity and/or type of one or more network nodes 130 in network 120, a quantity and/or type of connections 121 between network nodes 130 in network 120, a quantity of traffic flows on a connection 121 and/or between network nodes 130, a bandwidth and/or traffic capacity of a connection 121 between network nodes 130, a packet loss associated with a traffic flow on network 120, a jitter associated with a traffic flow on network 120, a latency associated with a traffic flow on network 120, a duration of a traffic flow on network 120, transmission control protocol (TCP) information associated with a traffic flow on network 120 (e.g., window size, retransmission rate, round-trip time, etc.), whether a route to a particular network node and/or destination device 150 is available, a quantity of available routes to a particular network node 130, a network service provider and/or operator associated with network 120, a cost associated with routing traffic via different connections 121 in network 120, or other information associated with network 120, a network node 130, a connection 121 between network nodes 130, and/or a traffic flow between network nodes 130.

For example, controller 110 may analyze the network data 101 to determine a topology associated with network 120, and the network topology may identify network nodes 130 included in network 120, connections 121 between network nodes 130, traffic flows on the links, and/or information associated with network nodes 130, the links, and/or the traffic flows. For example, the network topology may identify an amount of bandwidth consumed by a network node 130 and/or a connection 121, an amount of bandwidth available on a network node 130 and/or a connection 121, a jitter associated with a network node 130 and/or connection 121, a latency associated with a network node 130 and/or a connection 121, a path diversity between network nodes 130 and/or connections 121 (e.g., a quantity of paths that can be used to route information between two or more network nodes 130), an average packet loss of a traffic flow between network nodes 130, an average duration of a traffic flow between network nodes 130, and/or other network attributes associated with network 120.

In some implementations, controller 110 may collect and/or analyze network data 101 using one or more network management protocols, such as OPENFLOW, simple network management protocol (SNMP), Syslog, NetFlow, information protocol flow information export (IPFIX), structured information (e.g., in a packet header) from user datagram protocol (UDP), TCP, hypertext transfer protocol (HTTP) (e.g., structured via representational state transfer (REST) architecture), or another protocol.

Controller 110 may further identify or receive from flow attributes 103 identifying attributes of flow data 102 (e.g., identifying source device 140 and/or destination device 150, header field values or other information included in flow data 102, associated transmission protocols, etc.). Controller 110 may further identify an application associated with flow data 102 based on the attributes. For example, controller 110 may examine values of a header field, a format or contents of payload data, etc. of a data unit (e.g., packet) included in flow data 102 to identify the application. In another example, controller 110 may perform deep packet inspection (DPI) of a portion of flow data 102 to identify the application. For example, controller 110 may access and examine payload data carried in flow data 102 to identify an associated application.

Controller 110 may further communicate with network node 130-A to provide information associated with network 120 (e.g., commands 104) that identify potential data routes within network 120, a policy for routing flow data through network 120, etc. For example, source device may use a User-Network Interface (UNI) protocol to forward, in flow data 102, a request to network node 130-A to establish a path for carrying flow data 102, and controller 110 may determine path 105 and may forward, using a signaling protocol, commands 104 to network nodes 130 to establish path 105 through network 120.

Controller 110 may includes software, processes, algorithms, etc. that control configurable features of the network 120, such as automating discovery of the network nodes 130, capacity on the connections 121, port availability on network nodes 130, connectivity between the ports; dissemination of topology and bandwidth information between network nodes 130; calculation and creation of paths via connections 121; network level protection and restoration; etc. Controller 110 may be associated with an automatically switched optical network (ASON) as defined in inter alia G.8080/Y.1304, an architecture for the automatically switched optical network (ASON) (February 2005), a generalized multi-protocol label switching (GMPLS) architecture as defined in inter alia Request for Comments: 3945 (October 2004), etc. for controlling the network nodes 130 and establishing connections 121 therebetween. For example, in GMPLS, controller 110 may correspond to a distributed control plane (see, for example, FIG. 1D) with network nodes 130 exchange data to identify path 105.

Network 120 may include one or more wired and/or wireless private networks. For example, network 120 may include a local area network (LAN), a wide area network (WAN), a metropolitan area network (MAN), an intranet, and/or another type of private network. Alternatively, network 120 may include a public network in some implementations. In some implementations, network 120 may include a customer network, a network that connects devices of a data center, a third party network, etc. Additionally or alternatively, network 120 may include an autonomous system (e.g., a collection of connected Internet protocol (IP) routing prefixes, under the control of a network operator, that presents a common, clearly defined routing policy).

Additionally or alternatively, network 120 may include one or more wired and/or wireless service provider networks. For example, network 120 may include a cellular network, a public land mobile network (PLMN), a radio access network (RAN), a long term evolution (LTE) network, a second generation (2G) network, a third generation (3G) network, a fourth generation (4G) network, a fifth generation (5G) network, and/or another type of service provider network, or a combination of wired and wireless networks. Additionally or alternatively, network 120 may include a LAN, a WAN, a MAN, an intranet, and/or another type of network.

In some implementations, network 120 may include a software-defined network portion and a non-software-defined network portion (e.g., a portion that is not managed by controller 110). Additionally or alternatively, a first portion of network 120 may utilize a first SDN protocol (such as OPENFLOW) to process network traffic, and a second portion of network 120 may use a second, different SDN protocol (such as a PCE-based protocol).

Network nodes 130 may include one or more traffic transfer devices. For example, network node 130 may include a router, an a switch, a firewall, a hub, a bridge, a gateway, a modem, a network interface card (NIC), an optical add-drop multiplexer (OADM), a server, and/or another device capable of transmitting, receiving, transferring, and/or processing network traffic. Network node 130 may include an edge device, such as an edge router or an edge gateway, and may transfer traffic between different networks 120. Additionally or alternatively, a network node 130 may include optical network elements, switches, routers, cross-connects, etc. configured to use a control plane for management thereof. In one embodiment, network node 130 may include Ethernet and Optical Transport Network (OTN) switch, an OTN add/drop multiplexer (ADM), synchronous optical networking (SONET) and/or synchronous digital hierarchy (SDH) ADM, a multi-service provisioning platform (MSPP), a digital cross-connect (DCS), an optical cross-connect, a wavelength-division multiplexing (WDM)/dense wavelength division multiplexing (DWDM) terminal, a switch, a router, and the like.

As used herein, connection 121 may refer to a physical or logical connection between two or more network nodes 130. Connections 121 may also include intermediate network nodes 130.

Source device 140 and destination device 150 may include devices capable of accessing and communicating with each other via network 120. For example, each of source device 140 and destination device 150 may include a server, a desktop computer, a laptop computer, a tablet computer, a handheld computer, a smart phone, a radiotelephone, a gaming system, a set-top box, or a similar device. In some implementations, source device 140 and destination device 150 may communicate with one or more network nodes 130. Although shown as being external to network 120, it should be appreciated that source device 140 and/or destination device 150 may be included within network 120. For example, a network node 130 may function as source device 140 or destination device 150 to generate or receive flow data 102.

In some implementations, controller 110 may be includes as a component and/or may be implemented as a software application executing on a network node 130. In this way, controller 110 may operate as or be included in a network node 130 within network 120. As shown in FIG. 1B, controller 110 may be included as a component of network node 130-A that receives flow data 102 from source device 140. In another example, controller 110 may obtain network data 101 and/or may forward commands 104 via connections 121 to other network nodes 130. Additionally or alternatively, controller 110 may determine network data 101 based on monitoring the transmission of other data, such as data associated with other flows and/or test data. Alternatively or in addition to distributing commands 104, controller 110 may dynamically adjust an attribute of flow data 102 (e.g., a next hop identifier, a QoS value, etc.) and this adjusted attributed may cause other network nodes 130 to distribute flow data 102 via path 105.

Although controller 110 is shown in FIG. 1A as communicating with network node 130-A that receives flow data 102 from source device 140, in some implementations, controller 110 may exchange data with one or more other network nodes 130 (e.g., a network node 130 that does not exchange flow data 102 with source device 140 and/or is not included in path 105). For example, as shown in FIG. 1C, environment 100-C may include controller 110 that communicates with network node 130-D to obtain network data 101 and/or flow attributes 103 (e.g., via network node 130-A receiving flow data 102 from source device 140). Controller 110 may further communicate with network node 130-D to forward commands 104 that cause flow data 102 to be routed via connections 121 associated with path 105. As further shown in FIG. 1C, network node 130-D, that communicates with and/or is associated with controller 110, may be excluded from path 105.

Although a single controller is shown in FIGS. 1A-1C, environment 110-D may include multiple controllers 110. For example, a second controller 110 (or other components, such a of network node 130) may perform the functions performed by a first controller 110 to support redundancy, so the second controller 110 may take over the functions of the first controller 110 if the first controller 110. In some implementations, controller 110 may provide the functionality described herein via software. For example, as shown in FIG. 1D, network 120 may include controllers 110-A through 110-D associated with and/or included within network nodes 110-A through 110-D. For example, controllers 110-A through 110-D may be includes as components included in and/or may be implemented as a software applications executed on network nodes 130. In this example, controllers 110-A through 110-D may collect network data 101 and/or generate commands 104 in a distributed manner.

In another implementation shown in FIG. 1E, environment 100-E may include multiple networks 120 (shown in FIG. 1E as network 120-A and network 120-B) with multiple controllers 110 (shown in FIG. 1E as controller 110-A and controller 110-B). For example, network 120-A may correspond to a first type of network (e.g., an optical network) and network 120-B may correspond to a second, different type of network (e.g., a wireless or wired data network). Each of network 120-A and network 120-B may be associated with separate controller 110-A and controller 110-B. For example, first controller 110-A may collect first network data 101-A associated with first network 120-A and may forward first commands 104-A for routing flow data 102 through first network 120-A. Similarly, second controller 110-A may collect second network data 101-B associated with second network 120-B and may forward second commands 104-B for routing flow data 102 through second network 120-B. Controllers 110-A and 110-B and may communicate with each to determine a path 105 through networks 120-A and 120-B) for routing flow data 102. For example, controller 110-A may determine expected attributes (e.g., bandwidth, latency, packet drops, jitter, etc.) associated with transmission of flow data 102 via network 120-A, and controller 110-B may use this information to determine an appropriate path 105 through network 120-B so that aggregate attributes associated with transmitting flow data 102 through both network 120-A and 120-B comply with a desired policy goals.

The number of devices/networks shown in FIGS. 1A-1E is provided merely as an example. In practice, environment 100 may include additional devices/networks, fewer devices/networks, different devices/networks, or differently arranged devices/networks than those shown in FIGS. 1A-1E. For example, environments 100-A through 100-E are shown in FIGS. 1A-1E as fully meshed (e.g., a connection 121 connects each of network nodes 130), but it should be appreciated that a connection 121 may not be present and/or may be unavailable (e.g., the connection 121 is business and/or defective) between two network nodes 130. Furthermore, two or more devices shown in FIGS. 1A-1E may be implemented within a single device, or a single device shown in FIGS. 1A-1E may be implemented as multiple, possibly distributed devices. Additionally, one or more of the devices of environment 100 may perform one or more functions described as being performed by another one or more devices of environment 100.

Figure 2:
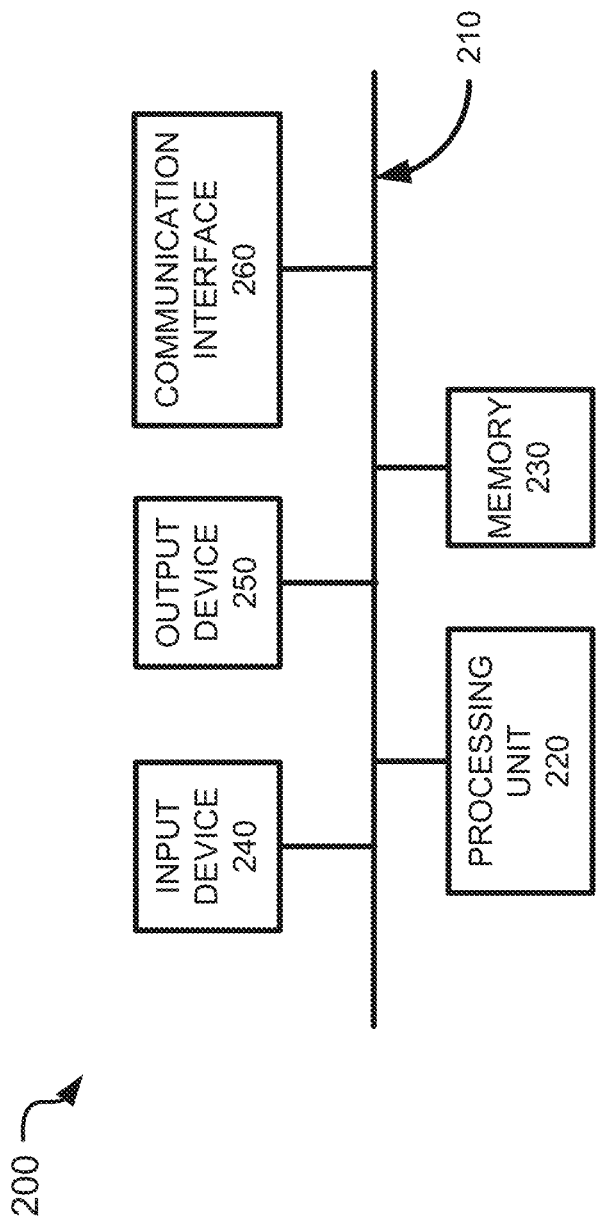
FIG. 2 illustrates an exemplary components of a device included in the environments of FIGS. 1A-1E.

FIG. 2 is a diagram of exemplary components of a device 200. Controller 110, a network node 130 or other component of network 120, a source device 140, or destination device 150 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of environment 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than those depicted in FIG. 2. Alternatively, or additionally, one or more components of device 200 may perform one or more other tasks described as being performed by one or more other components of device 200.

Figure 3:
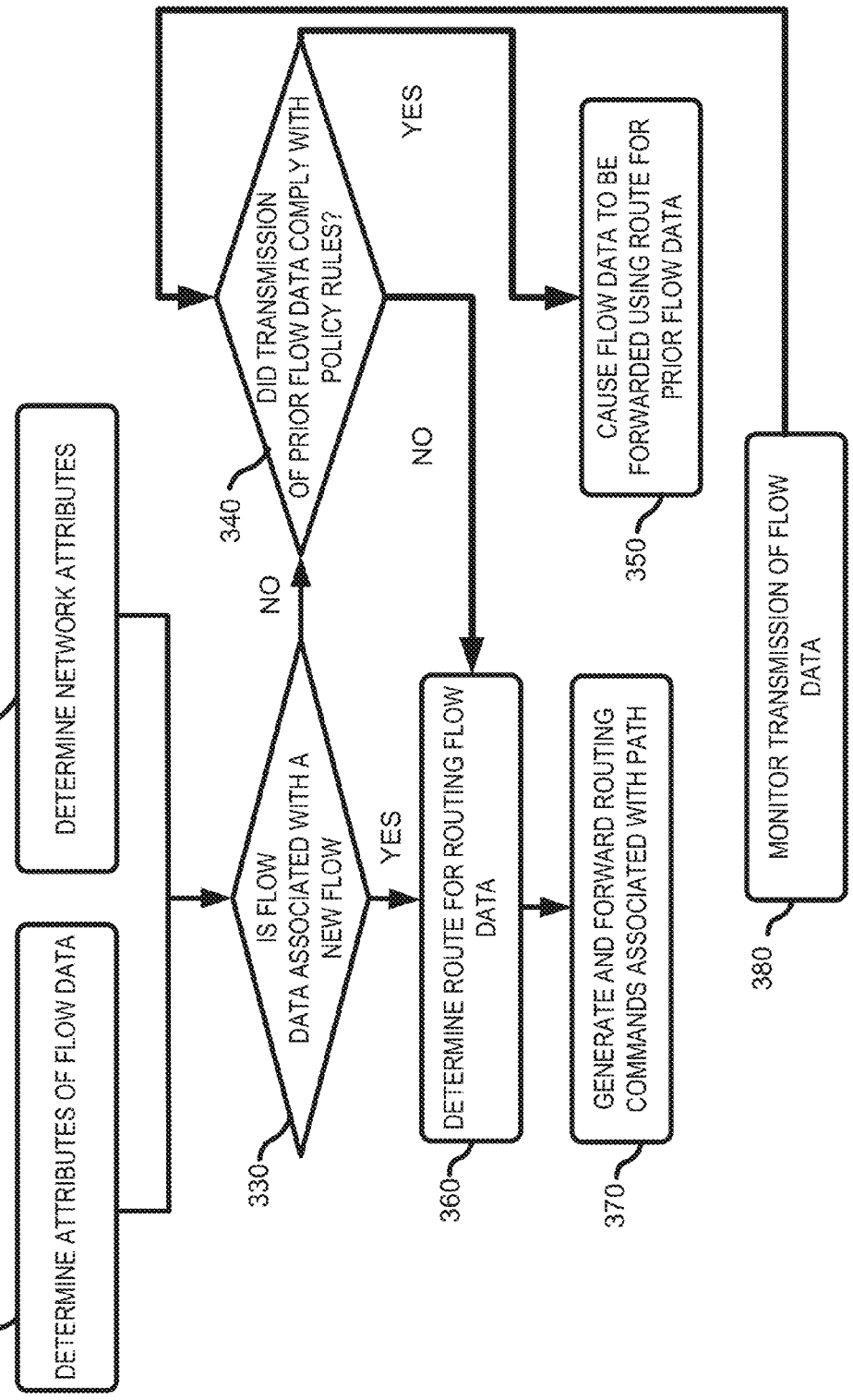
FIGS. 3 and 4 are flowcharts illustrating exemplary processes for routing flow data within the environments of FIGS. 1A-1E.

FIG. 3 shows a flow chart of an exemplary process 300 for routing flow data 102. Process 300 may be performed by controller 110. Additionally or alternatively, one or more portions of process 300 may be performed by another component or a group of components included in environment 100 that are separate from or include controller 110, such as network node 130-A receiving flow data 102 from source device 140 and/or another network node 130.

As shown in FIG. 3, process 300 may include determining attributes of flow data 102 (block 310). For example, as shown in FIG. 1A, network node 130-A may determine information regarding flow data 130-A (e.g., to identify source device 140, destination device 150, a transmission protocol, etc.), and may forward this information as flow attributes 103. Additionally or alternatively, controller 110 may dynamically determine flow attributes 103. For example, controller 110 may receive, from network node 130-A, a portion (e.g., one or more packets or other data units) of flow data 102, and controller 110 may evaluate the portion to identify flow attributes 103. For example, controller 110 may evaluate a header of a data packet (e.g., an internet protocol, or IP, packet) to identify an address for source device 140, an address for destination device 150, a protocol regarding the format of the payload, etc. In another example, if flow data 102 relates to wireless communications data, controller 110 may evaluate a header to extract a syncword that may be used to adjust a transmission of the wireless communications data and for frame synchronization. If flow data 102 relates to multimedia or graphics data, controller 110 may evaluate a header to determine a size, resolution, number of colors, format, etc. of an associated image.

Additionally or alternatively, controller 110 may evaluate contents (e.g., the payload) of data units being transmitted in flow data 102. Controller 110 may classify traffic included in flow data 102 using DPI techniques. In DPI, controller 110 may classify and analyze the flow data 102 using contents associated with the different protocol layers of the OSI (Open System Interconnections) model, to extract meaningful classification information. For example, controller 110 may extract and evaluate payload data included in flow data 102.

In another implementation, controller 110 may determine attributes associated with data units carried in flow data 102. For example, controller 110 may identify a length of data units (e.g., a minimum packet length, a maximum packet length, a average packet length, and/or a standard deviation in packet length) included in flow data 102 may also be calculated. Additionally or alternatively, controller 110 may identifying an inter-arrival time (or latency), minimum latency, the maximum latency, the average latency and the standard deviation (also called the jitter), etc. of data units in flow data 102, corresponding to an applicative session. Controller 110 may further evaluate a number of data units corresponding to an applicative session associated with flow data 102. As further described in block 430 of FIG. 4, controller 110 may further identify an application (or type of application) associated with flow data 102 based on flow attributes 103.

As shown in FIG. 3, process 300 may further include determining attributes of network 120 (block 320). For example, as shown in FIG. 1A, controller 110 may receive network data 101 from network node 130-A (or another network node 130). Additionally or alternatively, controller 110 may dynamically determine network data 101. For example, controller 110 may monitor and/or receive information (e.g., OPENFLOW data) regarding the status of communications on network 120 to identify a condition of network 120, a capability of network 120, a structure of network 120, or other information associated with network 120. For example, controller 110 may identify an amount of traffic and/or a bandwidth being utilized by network nodes 130, a traffic and/or bandwidth utilization rate of network nodes 130, an amount of traffic and/or a bandwidth supported by network nodes 130, a protocol supported by network nodes 130, a quantity and/or type of one or more network nodes 130 in network 120, a quantity and/or type of connections 121 between network nodes 130 in network 120, a quantity of traffic flows on a connection 121 and/or between network nodes 130, a bandwidth and/or traffic capacity of a connection 121 between network nodes 130, a packet loss associated with a traffic flow on network 120, a jitter associated with a traffic flow on network 120, a latency associated with a traffic flow on network 120, a duration of a traffic flow on network 120, transmission control protocol (TCP) information associated with a traffic flow on network 120 (e.g., window size, retransmission rate, round-trip time, etc.), whether a route to a particular network node and/or destination device 150 is available, a quantity of available routes to a particular network node 130, a network service provider and/or operator associated with network 120, a cost associated with routing traffic via different connections 121 in network 120, or other information associated with network 120, a network node 130, a connection 121 between network nodes 130, and/or a traffic flow between network nodes 130.

In block 320, controller 110 may further evaluate the status data (e.g., OPENFLOW data) obtained from one or more network nodes 130 to identify attributes of traffic transmission within network 120, and controller 110 may determine attributes of network 120 based on the status data. For example, controller 110 may use the status data to determine a topology associated with network 120 (e.g., identify connections 121 and/or network nodes 130). Controller 110 may further identify the status of traffic flows on connections 121. For example, controller 110 may identify an amount of bandwidth consumed by a network node 130 and/or a connection 121, an amount of bandwidth available on a network node 130 and/or a connection 121, a jitter associated with a network node 130 and/or connection 121, a latency associated with a network node 130 and/or a connection 121, a path diversity between network nodes 130 and/or connections 121 (e.g., a quantity of paths that can be used to route information between two or more network nodes 130), an average packet loss of a traffic flow between network nodes 130, an average duration of a traffic flow between network nodes 130, and/or other network attributes associated with network 120.

Returning to FIG. 3, controller 110 (and/or network node 130-A) may determine whether received flow data 102 is associated with a new flow or an existing flow (block 330). For example, controller 110 may determine, e.g., based on contents of a routing table and/or forwarding table associated with one or more network nodes 130, whether a session has previously been established between source device 140 and destination device 150 and, if so, whether flow data 102 is associated with the previously routed session. In another example, controller 110 may inspect contents (e.g., header fields and/or payload) of flow data 102 to determine whether flow data 102 is associated with a request to establish a session or is intermediate data that is sent in connection with a prior request to establish a session.

If flow data 102 is associated with an existing flow (330-No), controller 110 may determine whether prior transmission of data associated with the existing flow complied with one or more policy rules associated with the flow (block 340). For example, controller 110 may use network data 101 to determine whether characteristics associated with the transmission of the prior flow data satisfied one or more desired criteria (e.g., bandwidth, latency, jitter, transmission time, etc.) associated with the flow. The policy rule and the associated one or more desired transmission criteria may be determine based on, for example, a service level agreement (SLA) associated with source device 140 and/or destination device 150. As further described below with respect to block 440 in FIG. 4, controller 110 may identify a policy for transmission of flow data 102 based on an application associated with flow data 102.

Returning to FIG. 3, if flow data 102 is associated with an existing flow (330-No) and the prior transmission of data associated with the existing flow complied with the one or more policy rules (block 340-Yes), flow data 102 may be transmitted via the path used for prior transmission for the flow (block 350). For example, controller 110 may forward commands 104 to update the forwarding/routing tables associated with network nodes 130 to cause flow data 102 to be transmitted using a path 105 associated with the prior transmission. Additionally or alternatively, controller 110 may notify network node 130-A that flow data 102 is associated with an existing flow and may identify the existing flow, so that network node 130-A may transmit flow data 102 based on prior commands 104 associated with the existing flow.

As shown in FIG. 3, if flow data 102 is associated with a new flow (330-Yes) or the prior transmission of data associated with the existing flow failed to comply with the one or more policy rules (block 340-No), controller 110 may determine a new path 105 that includes connections 121 and network nodes 130 within network 120 for carry flow data 102 (block 360). For example, controller 110 may identify, based on network data 101, the topology of network 120 (e.g., identifying network nodes 130 and connections 121 between network nodes 130), and controller 110 may evaluate activity on network nodes 130 and connections 121 to identify available paths (e.g., network nodes 130 having unused ports and connections 121 having available transmission capacity). For example, controller 110 may identify combinations of network nodes 130 and connections 121 within network 120 that connect source device 140 and destination device 150 and that are not already being used to carry traffic.

In block 360, controller 110 may further select path 105 from among the available network nodes 130 and connections 121. For example, controller 110 may apply various logic rules to select path 105, such as to load balance within network 120. For example, controller 110 may provision network nodes 130 to route flow data 102 to destination device 150 based on a load balancing algorithm, such as by routing flow data among different to network nodes 130 that are selected using a round robin algorithm, a least load first algorithm (e.g., routing the packet to an available network node 130 processing the least amount of traffic, routing the traffic via a connection 121 carrying the least amount of traffic, etc.), a shortest path algorithm (e.g., a series of network nodes 130 that provides the shortest, quickest, least costly, etc. route to a destination device), etc. Additionally or alternatively, controller 110 may support TCP tuning techniques that may adjust the network congestion avoidance parameters of TCP connections (e.g., over a high bandwidth, high latency network). For example, controller 110 may receive information that identifies desired TCP parameters and may modify the TCP parameters of flow data 102 based on the desired TCP parameters.

Controller 110 may further identify one or more desired transmission characteristics associated with flow data 102, and controller 110 may select from among the available network nodes 130 and connections 121 to combine to form path 105 that satisfies the one or more desired transmission characteristics. For example, controller 110 may identify an SLA associated with source device 140 and/or destination device 150, and controller 110 may identify a path 105 within network 120 that satisfies the SLA. As further described below with respect to FIG. 4, controller 110 may further identify an application (or type of application) associated with flow data 102, and controller 110 may identify path 105 that satisfies one or more desired transmission characteristics associated with the application (or type of application).

As further shown in FIG. 3, controller 110 may generate and forward routing commands 104 associated with the selected path 105 (block 370). For example, controller 110 may update routing and/or forwarding tables associated with network node 130-A to cause flow data 102 to be routed through network via path 105. Additionally or alternatively, controller 110 may provision one or more network nodes 130 and/or connections 121 for routing flow data 102. For example, controller 110 may send routing commands 104 to network node 130-A (or another network node 130), and network node 130 may route the packet based on the routing commands 104. The routing commands 104 may identify flow data 102, may identify a next network node 130 (e.g., a next hop) to forward flow data 102, may identify a bandwidth to allocate to flow data 102, etc.

Additionally or alternatively, controller 110 may perform various actions to enable flow data 102 to be carried across multiple different types of networks 120. For example, controller 110 may perform network address translation (NAT), such as by modifying IP address information in a packet header while routing flow data 102 from a first network 120 to a second network 120. Additionally or alternatively, controller 110 may establish a VPN session and/or an IPsec session for a traffic flow that includes the packet, such as by authenticating and encrypting a packet in flow data 102 (and other packets transmitted in an associated session).

In one implementation shown in FIG. 3, process 300 may include controller 110 monitoring transmission of a portion of flow data 102 (block 380) and determining with transmission of the portion of flow data 102 conforms to a desired transmission criteria (block 340). If the transmission of the portion of flow data 102 does not conform to the desired transmission criteria such as a packet delay, a flow duration, a latency, a jitter, speed, transmission rate, bandwidth, etc. associated with the first route (or path 105) does not satisfy a threshold (block 340-No), then controller 110 may determine a second, different route for transmitting flow data 102 (block 360). In some implementations, controller 110 may test the second route to verify that the second route satisfies the one or more criteria and may terminate the first route (e.g., may route the traffic flow via the second route rather than the first route) based on determining that the second route satisfies the criteria. Additionally or alternatively, controller 110 may direct network node 130 to drop, reject, and/or queue a packet based on whether a network attribute, associated with path 105, satisfies the transmission criteria.

Figure 4:
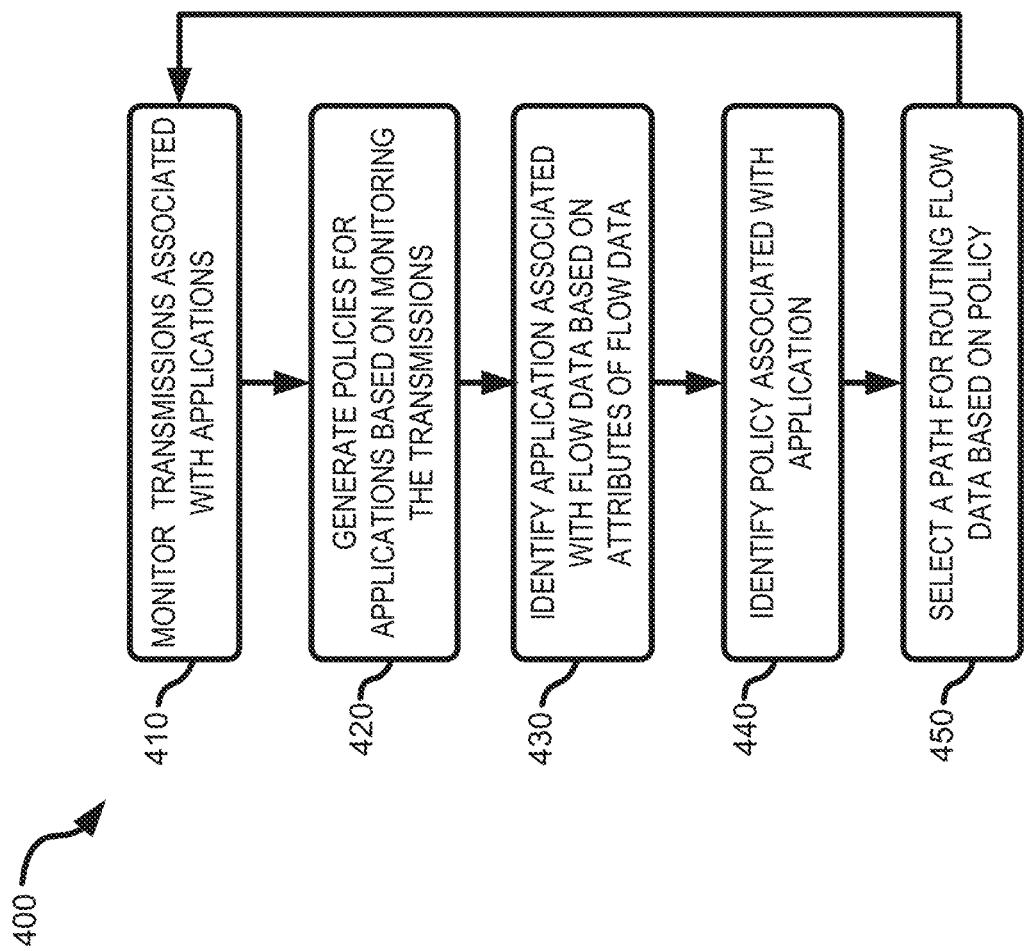

FIG. 4 shows a flow chart of an exemplary process 400 for selecting path 105 from among network nodes 130 and/or connections 121 within network 120 in block 360. Process 400 may be performed by controller 110. Additionally or alternatively, one or more portions of process 300 may be performed by another component or a group of components included in environment 100 that are separate from or include controller 110, such as one or more network nodes 130.

As shown in FIG. 4, process 400 may include monitoring transmission associated with different applications (block 410) and generating/updating policies for the different applications based on monitoring the transmissions (block 420). For example, controller 110 may monitor known transmissions associated with different applications and select paths for these transmission based on various criteria, such as managing bandwidth, customer SLAs, minimizing system operation costs, etc. Controller 110 may measure various transmission performance metrics associated with the transmission (e.g., bandwidth, jitter, packet loss, delays, etc.) associated with transmitting various data associated with the application, and controller 110 may receive a user input identifying desired to transmission performance metrics associated with each of the applications. For example, controller 110 may provide an interface that enables a user to provide feedback and indicate whether the user was satisfied with the prior transmission. If the user is satisfied with a prior transmission associated with an application, then the transmission performance metrics associated with the prior transmission may be used as policy components for handling a future data transmission for an application. In another example, monitoring of the prior transmissions may be bypassed, and the policy criteria may be determined based on input received from a user or another operator, such as a developer associated with an application. In yet another example, policy criteria may be received from the application forwarding the flow data so that the application can dynamically modify an associated transmission policies based on a current function, associated users, network conditions, etc. For example, a communications application (e.g., a VoIP program) may request different policy for handling traffic related to emergency communications.

As shown in FIG. 4, process 400 may further include identifying an application (or type of application) associated with flow data 102 based on the flow attributes 103 (block 430). For example, controller 110 may evaluate contents of header data associated data units included in flow data 102 to identify an associated application (or application type). For example, a header may include one or more fields identifying an application (or type of application) or may include information that may be used by controller 110 to identify the application (or type of application). Additionally or alternatively, controller 110 may evaluate payload contents of data units included in flow data 102. For example, controller 110 may use DPI techniques to access and review the contents to identify the application (or the type of application) associated with flow data 102. For example, controller 110 may combine and review the payload of two or more data units to reform transported data to identify an application (application type) associated with data or commands carried in the payload data. In another example, controller 110 may determine properties associated with flow data 102 (e.g., a data unit length or format, number of data units, etc.) and identify the application or application type based on the attributes associated with flow data 102. Application types may include, for example, bulk applications like File Transfer Protocol (FTP), interactive applications like Secure Shell (SSH) and TELNET, web applications based on the Hypertext Transfer Protocol (HTTP) protocol, peer-to-peer applications, messaging applications such as e-mail or s short-messaging service (SMS), multimedia applications such as audio and video streaming, etc.

In another example, controller 110 may identify an application associated with data based on flow characteristics. For example, characteristics associated with an encoded/encrypted flow may be evaluated to identify an application associated with the encoded flow. For example, the controller may determine an quantity of packets included in a flow, a quantity of packets transmitted in a time period, formatting of the packets, or other flow attributes, and may compare these attributes to attributes associated with data for various applications to identify an associated application.

As shown in FIG. 4, process 400 may further include identifying a policy applicable to the application (or type of application) associated with flow data 102. For example, controller 110 may identify transmission characteristics for an SLA associated with source device 140 and/or destination device 150. Additionally or alternatively, controller 110 may store desired transmission characteristics (e.g., a minimum bandwidth, maximum packet drops, maximum latency/delay, etc.) associated with different application or types of application. For example, the bulk applications may be associated with a first policy to achieve a desired bandwidth and a packet drop levels; the messaging applications may be associated with a second policy to achieve desired latency/delay and transmission time values; and the multimedia applications may be associated with a third policy to achieve a desired bandwidth and jitter levels.

As shown in FIG. 4, controller 110 may select a path for routing flow data based on the selected policy (block 450). For example, controller 110 may identify transmission characteristics, such as a bandwidth and/or a utilization rate associated with a network node 130 and/or a connection 121, and may evaluate network data 101 to identify paths within network 120 that satisfy the identified transmission characteristics. Additionally or alternatively, the routing policy may identify specific network nodes 130 and/connections 121 that are included in path 105. In some implementations, selected policy may identify one or more criteria (e.g., cost, throughput, speed, duration, packet loss, jitter, latency, delay, etc.) that should be used by controller for routing flow data 102.

In one implementation, if none of the available routes in network 120 satisfies the one or more desired criteria associated with a policy, controller 110 may select a best available path that enables flow data 102 to be transmitted with transmission characteristics that are as close as possible to the desired one or more criteria. Additionally, controller 110 may forward an error message to network node 130-A, source device 140, and/or destination device 150 to indicate that flow data 102 cannot be transmitted via network 120 at with the desired transmission characteristics.

As shown in FIG. 4, process 400 may further include returning to block 410 to monitor transmissions for an application based on an existing policy and updating the policy in block 420 to reflect updated user feedback, changes in network conditions, new application features/functions, etc.

Figure 5:
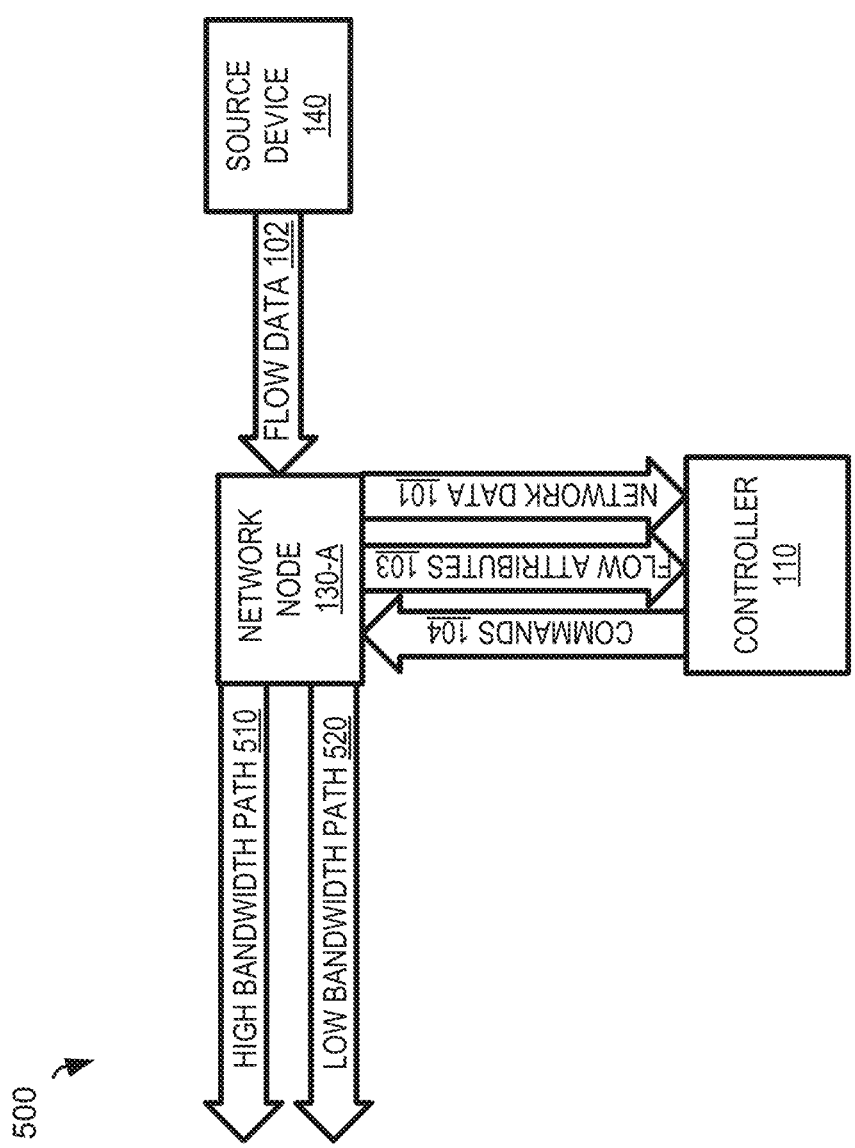
FIG. 5 illustrates a portion of the environments of FIGS. 1A-1E.

Principles described herein are discussed with respect to a portion 500 of environment 100 shown in FIG. 5. As shown in FIG. 5, portion 500 may include controller 110, network node 130-A, source device 140, a high bandwidth path 510, and a low bandwidth path 520.

As described above with respect to FIGS. 1A-1E, controller 110 may receive and/or determine network data 101 and flow attributes 103, and controller 110 may forward commands 104 that cause network node 130-A to route flow data 102 via one of high bandwidth path 510 and/or low bandwidth path 520. For example, if flow data 102 relates to an application (e.g., a messaging application) associated with a policy for a low maximum bandwidth, controller 110 may forward commands 104 that cause node 130-A to route flow data 102 via low bandwidth path 520. If source device 140 (and/or destination device 150 shown in FIGS. 1A-1E) is associated with an SLA would generally cause flow data 102 to be transmitted via a high priority path (e.g., high bandwidth path 510), commands 104 may cause network node 130-A to reduce a priority associated with flow data 102 (e.g., to modify QoS header values included in flow data 102) so that flow data 102 is routed via low bandwidth path 520 despite the SLA.

In another example, if flow data 102 relates to an application (e.g., a multimedia application) associated with a policy for a high minimum bandwidth, controller 110 may forward commands 104 that cause node 130-A to route flow data 102 via high bandwidth path 510. If source device 140 (and/or destination device 150 shown in FIGS. 1A-1E) is associated with an SLA would generally cause flow data 102 to be transmitted via a low priority path (e.g., low bandwidth path 520), commands 104 may cause network node 130-A to increase the priority associated with flow data 102 (e.g., to modify QoS header values included in flow data 102) so that flow data 102 is routed via high bandwidth path 510 despite the SLA.

The number of devices/networks shown in FIG. 5 is provided merely as an example. In practice, portion 500 may include additional devices/networks, fewer devices/networks, different devices/networks, or differently arranged devices/networks than those shown in FIG. 5. Furthermore, two or more devices shown in FIG. 5 may be implemented within a single device, or a single device shown in FIG. 5 may be implemented as multiple, possibly distributed devices. Additionally, one or more of the devices of portion 500 may perform one or more functions described as being performed by another one or more devices of portion 500.

In summary, in systems and methods described herein, controller 110 that is included in one or more network nodes 130 or operates independently in an SDN network 120 may calculates the best OPENFLOW or other SDN path between point A and point B in network 120 in term of bandwidth, response time, or other performance criteria, and controller 110 may mark the path 105 with a high priority so that the path 105 will be taken next (e.g., allocated to the next flow), and controller 110 may function as a PCE to create flows if the best path is not in a flow table associated with network 120.

Controller 110 may further function as a network management server to calculate a best OPENFLOW path between point A and point B in a network in term of bandwidth/response time, controller 110 may mark the path with a high priority so that the path will be taken next and may forward flows to a most appropriate network node 130. For example, controller 110 may function as a PCE according to RFC 5440.

Controller 110 may further function an as a network monitoring system (NMS) resource device that determine real-time network resource information with respect with all network elements defined in the domain of controllers 110 of the SDN network 120. Controller 110 may further function as a policy manager to obtain network wide allowable parameter settings for each network applications, and may communicates with applications for application-specific SLA requirements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to processes 300 and 400 in FIGS. 3 and 4, the order of the blocks may be modified in other implementations. Further, non-dependent blocks in processes 300 and 400 may be performed in parallel.

For example, processes 300 and 400 may include routing flow data in one portion of a path 105 based on an associated application and may route the flow data in another portions of the path 105 based on other criteria, such as security, costs, reliability, etc. For example, if controller 110 is associated with an SDN in a first network 120 and has no control over another network 120 (e.g., a network that is not OPENFLOW compatible and/or is controlled by another entity), controller 110 may route flow information 102 within the first network 120 based on an associated application and may cause the flow information 102 to be routed in the second network 120 based on other criteria. For example, controller 120 may modify an QoS or other priority values associated with flow information 102 within the first network 120 so that flow information 102 is routed via a particular path 105 and may return the QoS or other priority values associated with flow information 102 to original values so that flow information 102 is routed through second network 120 based on other criteria that may be unrelated to the application (e.g., a cost associated with handling the flow data 102). In yet another example, a first controller 110 (associated with first network 120) may interface with a second controller (associated with second network 120) to identify an application or related desired routing conditions (e.g., desired bandwidth, jitter, delay, or other transmission rates) and may request second network 120 to transmit flow information 102 according to the desired routing conditions.

It will be apparent that different aspects of the description provided above may be implemented in many different forms of machine-readable instructions, firmware, and hardware in the implementations illustrated in the figures. The actual machine-readable instructions or specialized control hardware used to implement these aspects is not limiting of the invention. Thus, the operation and behavior of these aspects were described without reference to the specific machine-readable instructions—it being understood that machine-readable instructions and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and machine-readable instructions.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
  a memory configured to store a plurality of routing policies for achieving particular transmission characteristics associated with a plurality of application types, wherein the plurality of routing policies are determined based on monitoring previous transmissions associated with each of the plurality of application types, measuring transmission performance metrics associated with the previous transmissions, and selecting routes for subsequent transmissions associated with each application type based on the measured transmission performance metrics; and
  a processor configured to:
    determine network data identifying an attribute associated with a network,
    determine a flow attribute associated with flow data,
    identify, based on the flow attribute and from the plurality of application types, an application type associated with the flow data,
    determine a routing policy, of the plurality of routing policies, associated with the identified application type, wherein the routing policy identifies a desired value or a desired range of values associated with transmitting the flow data,
    select, based on the network data and the routing policy, a route from a plurality of routes within the network to carry the flow data, wherein transmission of the flow data via the selected route is expected, based on the network data, to satisfy the desired value or the desired range of values, and
    cause the flow data to be transmitted within the network via the selected route.

2. The device of claim 1, wherein the processor is further configured to:
  determine a topology of the network based on the network data, and
  identify the plurality of routes based on the topology.

3. The device of claim 1, wherein the network includes a plurality of network nodes, and wherein the device is included in one or more of the network nodes.

4. The device of claim 1, wherein the processor is further configured to:
  monitor transmission of a first portion of the flow data on the selected route to collect additional network data,
  determine, based on the additional network data, whether the transmission of the first portion of the flow data on the selected route satisfies the desired value or the desired range of values,
  select, when the transmission of the first portion of the flow data on the selected route does not satisfy the desired value or the desired range of values, another route from the plurality of routes to carry a second portion of the flow data, and cause the second portion of the flow data to be transmitted within the network via the other route.

5. The device of claim 1, wherein the processor, when determining the flow attribute associated with flow data, is further configured to perform deep packet inspection on at least a portion of the flow data.

6. The device of claim 1, wherein the processor, when causing the flow data to be transmitted within the network via the selected route, is further configured to:
change a quality of service (QoS) value associated with the flow data.

7. The device of claim 1, wherein the flow data is associated with a flow, and wherein the processor, when selecting the route to carry the flow data, is further configured to:
identify a particular route used for transmission of other flow data from the flow,
determine, based on the network data, whether the transmission of the other flow data via the particular route satisfies the desired value or the desired range of values,
when the transmission of the other flow data via the particular route satisfies the desired value or the desired range of values, select the particular route as the route to carry the flow data, and
when the transmission of the other flow data via the particular route fails to satisfy the desired value or the desired range of values, select one of the plurality of routes that differs from the particular route as the route to carry the flow data.

8. The device of claim 1, where the network data identifies at least one of:
network nodes within the network,
connections between the network nodes,
a status of ports included in the network nodes,
a status of the connections,
a status of data transmissions within the network,
a packet loss associated with the network,
a jitter associated with the network,
a latency associated with the network,
a bandwidth associated with the network, or
a cost associated with routing data over the network.

9. A method comprising:
determining, by a processor, network data identifying an attribute associated with a network;
determining, by the processor, a flow attribute associated with flow data received in the network;
identifying, by the processor and based on the flow attribute, an application type of a plurality of application types, associated with the flow data,
wherein the plurality of application types are associated with a plurality of routing policies for achieving particular transmission characteristics,
wherein the plurality of routing policies are determined based on:
monitoring previous transmissions associated with each of the plurality of application types,
measuring transmission performance metrics associated with the previous transmissions, and
selecting routes for subsequent transmissions associated with each application type based on the measured transmission performance metrics,
wherein a routing policy of the plurality of routing policies is associated with the identified application type, and
wherein the routing policy identifies a desired value or a desired range of values associated with transmitting the flow data;
selecting, by the processor, a route from a plurality of routes within the network to carry the flow data, wherein transmission of the flow data via the selected route is expected, based on the network data, to satisfy the desired value or the desired range of values; and
causing, by the processor, the flow data to be transmitted within the network via the selected route.

10. The method of claim 9, wherein causing the flow data to be transmitted within the network via the selected route further includes:
storing, in a forwarding table associated with the network, data associating the flow data with the selected route.

11. The method of claim 9, wherein the network includes a plurality of network nodes, and wherein the processor is included in one or more of the network nodes.

12. The method of claim 9, wherein the method further comprises:
monitoring transmission of a first portion of the flow data on the selected route to collect additional network data;
determining, based on the additional network data, whether the transmission of the first portion of the flow data on the selected route satisfies the desired value or the desired range of values;
selecting, when the transmission of the first portion of the flow data on the selected route does not satisfy the desired value or the desired range of values, another route from the plurality of routes to carry a second portion of the flow data; and
causing the second portion of the flow data to be transmitted within the network via the other route.

13. The method of claim 9, wherein determining the flow attribute associated with flow data includes:
extracting data from at least one of a header or a payload of a data unit included in the flow data.

14. The method of claim 9, wherein causing the flow data to be transmitted within the network via the selected route further includes:
changing a quality of service (QoS) value associated with the flow data.

15. The method of claim 9, wherein the flow data is associated with a flow, and wherein selecting the route to carry the flow data further includes:
identifying a particular route used for transmission of other flow data from the flow,
determining, based on the network data, whether the transmission of the other flow data via the particular route satisfies the desired value or the desired range of values;
selecting, when the transmission of the other flow data via the particular route satisfies the desired value or the desired range of values, the particular route as the route to carry the flow data; and
selecting when the transmission of the other flow data via the particular route does not satisfy the desired value or the desired range of values, one of the plurality of routes that differs from the particular route as the route to carry the flow data.

16. A non-transitory computer-readable medium to store instructions, the instructions comprising:
one or more instructions that, when executed by a processor, cause the processor to:
identify a plurality of routing policies for achieving particular transmission characteristics associated with a plurality of application types, wherein the plurality of routing policies are determined based on monitoring previous transmissions associated with each of the plurality of application types, measuring transmission performance metrics associated with the previous transmissions, and selecting routes for subsequent transmissions associated with each application type based on the measured transmission performance metrics, determine network data identifying an attribute associated with a network, determine a flow attribute associated with flow data, identify, based on the flow attribute and from the plurality of application types, an application type associated with the flow data, determine a routing policy, of the plurality of routing policies, associated with the identified application type, wherein the routing policy identifies a desired value or a desired range of values associated with transmitting the flow data, select, based on the network data and the routing policy, a route from a plurality of routes within the network to carry the flow data, wherein transmission of the flow data via the selected route is expected, based on the network data, to satisfy the desired value or the desired range of values, and route the flow data within the network via the selected route.

17. The non-transitory computer-readable medium of claim 16, wherein the one or more instructions further cause the processor to:

monitor transmission of a first portion of the flow data on the selected route to collect additional network data, determine, based on the additional network data, whether the transmission of the first portion of the flow data on the selected route satisfies the desired value or the desired range of values, select, when the transmission of the first portion of the flow data on the selected route does not satisfy the desired value or the desired range of values, another route from the plurality of routes to carry a second portion of the flow data, and cause the second portion of the flow data to be transmitted within the network via the other route.

18. The non-transitory computer-readable medium of claim 16, wherein the one or more instructions, when causing the processor to route the flow data within the network via the selected route, further causes the processor to:

change a quality of service (QoS) value associated with the flow data.

19. The non-transitory computer-readable medium of claim 16, wherein the flow data is associated with a flow, and wherein the one or more instructions, when causing the processor to select the route to carry the flow data, further causes the processor to:

identify a particular route used for transmission of other flow data from the flow, determine, based on the network data, whether the transmission of the other flow data via the particular route satisfies the desired value or the desired range of values, when the transmission of the other flow data via the particular route satisfies the desired value or the desired range of values, select the particular route as the route to carry the flow data, and when the transmission of the other flow data via the particular route fails to satisfy the desired value or the desired range of values, select one of the plurality of routes that differs from the particular route as the route to carry the flow data.

20. The non-transitory computer-readable medium of claim 16, wherein the one or more instructions, when causing the processor to determine the flow attribute associated with flow data, further causes the processor to:

extract data from at least one of a header or a payload of a data unit included in the flow data, and wherein the one or more instructions, when causing the processor to identify the application type associated with the flow data, further causes the processor to:

determine the application type based on the data extracted from the at least one of the header or the payload of the data unit included in the flow data.

\* \* \* \* \*